United States Patent
Takabayashi

(10) Patent No.: US 7,795,323 B2
(45) Date of Patent: Sep. 14, 2010

(54) ACTIVE RAY CURABLE INK-JET INK

(75) Inventor: Toshiyuki Takabayashi, Hachioji (JP)

(73) Assignee: Konica Minolta Medical & Graphic, Inc., Tokyo (JP)

(*) Notice: Subject to any disclaimer, the term of this patent is extended or adjusted under 35 U.S.C. 154(b) by 76 days.

(21) Appl. No.: 11/990,956

(22) PCT Filed: Aug. 11, 2006

(86) PCT No.: PCT/JP2006/315905

§ 371 (c)(1),
(2), (4) Date: Feb. 25, 2008

(87) PCT Pub. No.: WO2007/029448

PCT Pub. Date: Mar. 15, 2007

(65) Prior Publication Data

US 2009/0137695 A1    May 28, 2009

(30) Foreign Application Priority Data

Sep. 2, 2005    (JP) .............................. 2005-254548

(51) Int. Cl.
*C09D 11/00* (2006.01)

(52) U.S. Cl. .............................. 522/31; 522/78; 522/83; 522/168; 522/170

(58) Field of Classification Search .................... 522/31, 522/71, 74, 78, 168, 170, 178, 181, 909, 522/75

See application file for complete search history.

(56) References Cited

U.S. PATENT DOCUMENTS

| | | | |
|---|---|---|---|
| 6,620,229 B2 * | 9/2003 | Doi et al. .................... | 106/31.6 |
| 7,080,900 B2 * | 7/2006 | Takabayashi et al. ....... | 347/102 |
| 7,244,300 B2 * | 7/2007 | Taguchi .................... | 106/31.49 |
| 7,278,726 B2 * | 10/2007 | Nagai ......................... | 347/100 |
| 7,404,852 B2 * | 7/2008 | Ishibashi et al. .......... | 106/31.65 |
| 7,530,682 B2 * | 5/2009 | Tawaraya et al. .............. | 347/95 |
| 7,549,740 B2 * | 6/2009 | Yokoyama et al. ........... | 347/102 |
| 2005/0124726 A1 | 6/2005 | Yatake et al. | |
| 2006/0189715 A1 * | 8/2006 | Ishibashi et al. ............. | 523/160 |

FOREIGN PATENT DOCUMENTS

| | | |
|---|---|---|
| JP | 06-200204 A | 7/1994 |
| JP | 2000-504778 A | 4/2000 |
| JP | 2002-188025 A | 7/2002 |
| JP | 2004-002668 A | 1/2004 |
| JP | 2004-098402 A | 4/2004 |
| WO | WO 97/31071 A1 | 8/1997 |

* cited by examiner

*Primary Examiner*—Susan W Berman
(74) *Attorney, Agent, or Firm*—Frishauf, Holtz, Goodman & Chick, P.C.

(57) ABSTRACT

An active ray curable ink-jet ink comprising at least an organic pigment, a polymer dispersant, a photo-initiator and a cationic polymerizable compound, wherein the active ray curable ink-jet ink incorporates a quaternary ammonium salt and a content of the quaternary ammonium salt is not less than 5 ppm and not more than 500 ppm.

8 Claims, No Drawings though a solvent system, it is a system particularly difficult for adsorption between pigment and a dispersant due to a polar solvent arising from a polymerizing group being present, stable ultraviolet curable ink has not been obtained only by conventional technologies.

For example, in cationic polymerizing ultraviolet curable ink, an improving means against viscosity increase during storage described above is disclosed (please refer to, for example, Patent Document 4), however, stable dispersion cannot be achieved only by this technology and ejection becomes unstable when dispersion is unstable, which was a fatal problem as for ink-jet ink.

Patent Document 1: Unexamined Japanese Patent Application Publication No (hereinafter referred to as JP-A) 6-200204 (Claims, and Examples)

Patent Document 2: Japanese Translation of PCT International Application Publication No. 2000-504778. (Claims, and Examples)

Patent Document 3: JP-A 2002-188025 (pp. 2-7, and Examples)

Patent Document 4: JP-A 2004-2668 (Claims, and General description)

SUMMARY OF THE INVENTION

Problems to be Solved by the Present Invention

The present invention has been made in view of the above-described problem. An object of the present invention is to provide an active ray curable ink-jet ink which is superior in storage stability and ejection stability.

Means to Solve the Problems

The above-described object of this invention can be achieved by the following constitutions.

Item 1. An active ray curable ink-jet ink comprising at least an organic pigment, a polymer dispersant, a photo-initiator and a cationic polymerizable compound, wherein the active ray curable ink-jet ink incorporates a quaternary ammonium salt and a content of the quaternary ammonium salt is not less than 5 ppm and not more than 500 ppm based on the total weight of the active ray curable ink-jet ink.

Item 2. The active ray curable ink-jet ink described in Item 1 above, wherein the aforesaid cationic polymerizable compound is an epoxy compound.

Item 3. The active ray curable ink-jet ink described in Item 1 or 2 above, wherein the aforesaid photo-initiator is an onium salt and a content of the onium salt is not more than 5 weight % based on the total weight of the active ray curable ink-jet ink.

Item 4. The active ray curable ink-jet ink described in any one of aforesaid Items 1-3, wherein the aforesaid organic pigment is at least one type selected from C.I. Pigment Red 122, C. I. Pigment Red 185, C. I. Pigment Red 202 and C. I. Pigment Violet 19.

Item 5. The active ray curable ink-jet ink described in any one of aforesaid Items 1-3, wherein the aforesaid organic pigment is at least one type selected from surface treated C. I. Pigment Yellow 138, C. I. pigment Yellow 120, C. I. Pigment Yellow 150, C. I. pigment Yellow 151 and C. I. Pigment Yellow 180.

Item 6. The active ray curable ink-jet ink described in any one of aforesaid Items 1-3, wherein the aforesaid organic pigment is surface treated C. I. Pigment Blue 15:3 or C. I. pigment Blue 15:4.

Item 7. The active ray curable ink-jet ink described in any one of aforesaid Items 1-6, wherein the aforesaid polymer

ACTIVE RAY CURABLE INK-JET INK

This application is the United States national phase application of International Application PCT/JP2006/315905 filed Aug. 11, 2006.

FIELD OF THE INVENTION

The present invention relates to active ray curable ink-jet ink which is superior in storage stability and ejection stability.

BACKGROUND OF THE INVENTION

In recent years, an ink-jet recording method has been applied in various printing fields such as photography, various printing, special printing such as marking and color filters, because it is capable of image formation in a simple manner at a low cost. In particular, image quality comparative to silver salt photography can be obtained by employing a recording apparatus to eject and control micro dots; ink having been improved in such as a color reproduction range, durability and ejection adaptability; and exclusive paper having been rapidly improved in such as coloring ability of colorant and surface glossiness. Image quality improvement of an ink-jet recording method of today can be achieved only when all of a recording apparatus, ink and exclusive paper are employed in combination.

However, in an ink-jet system requiring exclusive paper, there cause problems of limitation of a recording medium and cost up of a recording medium. Therefore, many attempts have been made to record on a medium, on which image is transferred, different from exclusive paper by an ink-jet method. Specifically, they are such as a phase transition ink-jet method which utilizes wax ink being solid at room temperature, a solvent system ink-jet method which utilizes a rapid drying organic solvent as a primary component, and an ultraviolet curable ink-jet method in which cross-linking by active rays such as ultraviolet rays (UV) is conducted after recording.

For example, ultraviolet curable ink includes radical polymerization type ultraviolet curable ink primarily comprising an acryl type composition (for example, refer to patent documents 1 and 2), and cationic polymerization type ultraviolet curable ink (for example, refer to patent document 3). Radical polymerization type ultraviolet curable ink has a problem of deterioration of curing ability due to sensitivity to an oxygen inhibition action under an environment including oxygen according to the polymerization mechanism. On the other hand a cationic polymerization type ultraviolet curable ink has a problem of easy progress of a dark reaction according to a property of the polymerization reaction resulting in viscosity increase during storage.

Further, as for a colorant in an ink-jet recording method, ink comprising primarily pigment being dispersed is often utilized in view of fastness of a formed image.

Generally, to achieve a stable dispersion characteristic, an important subject is how to achieve adsorption between a dispersant and pigment, and a non-polar interaction in the case of a polar dispersing solvent while a polar interaction in the case of a non-polar solvent is utilized. For example, in pigment dispersion of a solvent system, to utilize an acid base concept has been proposed. That is, a basic dispersant is utilized when pigment is acidic while an acidic dispersant is utilized when pigment is basic.

However, since ultraviolet curable ink utilizing a polymerizing compound as a dispersion solvent, though a solvent dispersant is provided with an acid value and a base value and the acid value is not less than the base value.

EFFECT OF THE INVENTION

This invention can provide an active ray curable ink-jet ink which is superior in storage stability and ejection stability.

DETAILED DESCRIPTION OF THE INVENTION

The inventors of this invention, as a result of extensive study in view of the above-described problems, have found that active ray curable ink-jet ink which is superior in storage stability and ejection stability can be realized by active ray curable ink-jet ink characterized in that a quaternary ammonium salt is incorporated and the content of the quaternary ammonium salt is not less than 5 ppm and not more than 500 ppm, which led to this invention.

In the following, each constituent element of active ray curable ink-jet ink of this invention will be detailed.

(Active Ray Curable Ink-Jet Ink)

An active ray curable ink-jet ink of this invention (hereinafter, being referred to as an active ray curable ink or simply as an ink) refers to the ink which initiates a polymerization reaction by irradiated light to be cured when the ink is irradiated by active rays. Herein, active rays refer to ultraviolet or visible rays having a wavelength of 180-500 nm, and the light source includes such as a mercury lamp, a high pressure mercury lamp, a ultra-high pressure mercury lamp, a metal halide lamp, a chemical lamp, a black light lamp, a mercury-xenon lamp, an excimer lamp, a short arc lamp, a helium•cadminum laser, an argon laser, an excimer laser and sunlight.

Herein, in the case that the ink of this invention is utilized in a recording method of an ink-jet method, an ink composition starts a polymerization reaction by irradiated active rays resulting in curing and adhesion of the composition on a printing medium after the ink of this invention is ejected and landed on a recording medium.

The active ray curable ink-jet ink of this invention is characterized by containing an organic pigment, a polymer dispersant, a photo-initiator and a cationic polymerizable compound, in addition to a quaternary ammonium salt, the content of which is preferably 5-500 ppm.

In the following, such as compositions of the active ray curable ink of this invention will be explained.

(Quaternary Ammonium Salt)

In the cationic polymerizable active ray curable ink, it is known that adsorption between a dispersant and a pigment is difficult due to the presence of a polar group arising from a polymerizing group, however, the inventors of this invention, as a result of study, have found that there is influence of the large content (the residual amount) of a quaternary ammonium salt in the ink, which is utilized in a pigment surface treatment, a post-treatment of a photo-initiator and utilized as a layer separation catalyst at the time of synthesis of a polymerizable compound, as factors to prevent adsorption between a dispersant and pigment, and that it is important to control the content to be in the range of 5-500 ppm. In aforesaid Patent Document 4, a technology to positively incorporate a quaternary ammonium salt in the ink is introduced, however, this system can control a dark reaction of a polymerizable compound during storage, however, never achieve stable dispersion characteristics at all. Curing is insufficient when the content of the quaternary ammonium salt is less than 5 ppm, while pigment aggregation will be generated after storage to induce poor ejection when the content is over 500 ppm. The content is preferably 5-300 ppm.

Examples of the quaternary ammonium salt, which is brought in from such as the aforesaid pigment, photo-initiator, polymerizable compound and other additives, include such as tetrabutylammonium bromide, tetrabutylammonium chloride, tetramethylammonium bromide, methyltrihexylammonium chloride, methyltrioctylammonium chloride, cetylpyridinium chloride, N-dodecyl-N'-methylimidazolium chloride and benzyltriethylammomnium chloride; however, are not limited thereto.

Herein, the content of these quarternary ammonium salts can be determined by an analytical means well known in the art such as high speed liquid chromatography, gas chromatography, elementary analysis, atomic absorption analysis, infrared absorption spectrometry, NMR spectrometry, mass spectrometry and titration analysis.

As a means to control the content of the quaternary ammonium salt into the range of 5-500 ppm, for example, can be controlled by carefully subjecting the aforesaid pigment, photo-initiator, polymerizable compound and other additives to a purification treatment such as plural times of washing treatments with water and a column adsorption treatment.

(Cationic Polymerizable Compound)

A cationic polymerizable compound incorporated in the ink of this invention is a compound capable of polymerization by a reaction product of a polymerization initiator by active rays as a trigger. As a polymerizable compound according to this invention, utilized can be a wide range of compounds which can start a polymerization reaction based on a reaction of an active species, which is generated from a photo-initiator according to this invention, that is, a cationic polymerization initiator by a photodecomposition by active rays, as a trigger.

As a cationic polymerizable monomer according to this invention, various types of cationic polymerizable monomers well known in the art can be utilized. For example, epoxy compounds, vinyl ether compounds and oxetane compounds which are exemplified in, such as, JP-A Nos. 6-9714, 2001-31892, 2001-40068, 2001-55507, 2001-310938, 2001-310937 and 2001-220526.

As a polymerizable compound according to this invention, every epoxy compound well known in the art can be utilized, however, it is more preferable to utilize an epoxy compound having been subjected to the aforesaid plural times of washing treatments with water or a column absorption treatment.

[Epoxy Compound]

Epoxy compounds applicable in this invention include such as the following aromatic epoxide, alicyclic epoxide and aliphatic epoxide.

Preferable aromatic epoxide is di- or poly-glycidyl ether which is prepared by a reaction of polyhydric phenol having at least one aromatic nucleus or an alkylene oxide adduct thereof, with epichlorohydrin, and includes such as di- or poly-glycidyl ether of bisphenol A or an alkylene oxide adduct thereof, di- or poly-glycidyl ether of hydrogenated bisphenol A or an alkylene oxide adduct thereof, and novolak type epoxy resin. Herein, alkylene oxide includes such as ethylene oxide and propylene oxide.

Alicyclic epoxide is preferably a compound containing cyclohexene oxide or cyclopentene oxide, which can be prepared by epoxidation of a compound having at least one cycloalkane ring such as a cyclohexene rig or a cyclopentene ring by use of a suitable oxidant such as hydrogen peroxide and peracid.

Preferable aliphatic epoxide includes such as di- or poly-glycidyl ether of aliphatic polyhydric alcohol or an alkylene oxide adduct thereof, and typical examples thereof include diglycidyl ether of alkylene glycol such as diglycidyl ether of ethylene glycol, diglycidyl ether of propylene glycol or diglycidyl ether of 1,6-hexanediol; polyglycidyl ether of polyhydric alcohol such as di- or triglycidyl ether of glycerin or an alkylene oxide adduct thereof; and diglycidyl ether of polyalkylene glycol such as diglycidyl ether of polyethylene glycol or an alkylene oxide adduct thereof and diglycidyl ether of polypropylene glycol or an alkylene oxide adduct thereof. Herein, alkylene oxide includes such as ethylene oxide and propylene oxide.

Among these epoxides, aromatic epoxide and alicyclic epoxide are preferable in view of rapid curing ability, and alicyclic epoxide is specifically preferable. In this invention, one type of the above-described epoxide may be utilized alone or at least two types may be utilized in appropriate combination.

Further, in this invention, an epoxy compound having an oxirane group is specifically preferably either one of epoxydated aliphatic ester or epoxydated aliphatic glyceride, with respect to safety of such as AMES and sensitization. Epoxydated aliphatic ester and epoxydated aliphatic glyceride are utilized without specific limitation provided that they are aliphatic ester and aliphatic glyceride, into which an epoxy group has been introduced.

As epoxydated aliphatic ester, utilized can be those prepared by epoxydation of oleic ester such as epoxy methyl stearate, epoxy butyl stearate and epoxy octyl stearate. Further, as epoxydated aliphatic glyceride, utilized can be those prepared by epoxydation of such as soybean oil, linseed oil and castor oil, such as epoxydated soybean oil, epoxydated linseed oil and epoxydated castor oil.

In the ink of this invention, for further improvement of storage stability, it is more preferable to incorporate a compound having an oxetane ring and a vinyl ether compound together with an alicyclic epoxy compound.

[Oxetane Compound]

As an oxetane compound utilized in this invention, every oxetane compound well known in the art such as disclosed in JP-A Nos. 2001-220526 and 2001-310937.

Further, it is preferable to utilize a mono-functional oxetane compound having one oxetane ring, and a poly-functional compound having at least two oxetane rings in combination with respect to improving film strength and adhesion on a recording medium after curing. However, when a compound having not less than 5 oxetane rings is utilized, handling may become difficult due to viscosity increase of an ink composition or tackiness of a cured product may become insufficient due to increased glass transition temperature of an ink composition. An oxetane compound utilized in this invention is preferably provided with 1-4 oxetane rings.

[Vinyl Ether Compound]

A vinyl ether compound utilizable in this invention includes a di- or tri-vinyl ether compound such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether and trimethylolpropane trivinyl ether; and a monovinyl ether compound such as ethyl vinyl ether, butyl vinyl ether, i-butyl vinyl ether, octadecyl vinyl ether, cyclohexyl vinyl ether, hydroxybutyl vinyl ether, 2-ethylhexyl vinyl ether, cyclohexane dimethanol monovinyl ether, propyl vinyl ether, i-propyl vinyl ether, i-propenyl ether-O-propylene carbonate, dodecyl vinyl ether, diethylene glycol monovinyl ether and octadecyl vinyl ether.

Among these vinyl ether compounds, a di- or tri-vinyl ether compound is preferable and di-vinyl ether is specifically preferable, with respect to curing ability, adhesion and surface hardness. In this invention, the above-described vinyl ether compound may be either utilized alone or in appropriate combination of at least two types.

(Photo-Initiator)

As a photo-initiator applicable in this invention, every onium compound well known in the art such as described in "Application and Market of UV•EB Curing Technologies" (CMC Publishing Co., Ltd., supervised by Yoneho Tabata/ edited by Rad Tech Japan). For example, listed are $B(C_6F_6)_4^-$, $PF_6^-$, $AsF_6^-$, $SbF_6^-$ and $CF_3SO_3^-$ salt of an aromatic onium compound such as diazonium, ammonium, iodonium, sulfonium and phosphonium. The content is preferably not more than 5 weight % against the total weight of ink. When it is over 5 weight %, a photo-initiator itself, similar to quaternary ammonium salt, may be a cause of disturbing adsorption between pigment and a dispersant and may generate pigment aggregation after storage to induce poor ejection behavior. Further, as an initiator of this invention, it is more preferable to utilize a photo-initiator which has been subjected to plural times of washing treatments with water and a column adsorption treatment, and a sulfonium salt is more preferably utilized among onium salts with respect to storage stability.

[Sulfonium Compound]

As an initiator according to this invention, a sulfonium salt is specifically preferably utilized among onium salts. Among them, a triaryl sulfonium salt is specifically preferred because of good storage stability as well as the addition amount can be easily increased due to excellent solubility into a polymerized compound resulting in restraining a residual amount of the polymerized compound.

As these photo-initiators of a triaryl sulfonium salt type, triarylsulfonium salt compounds represented by following formulas [S1]-[S4] are specifically preferable with respect to excellent stability in addition to superior solubility and sensitivity.

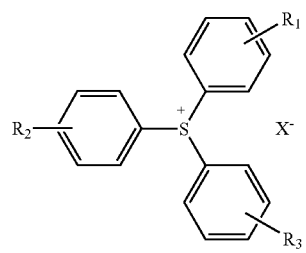

Formula [S1]

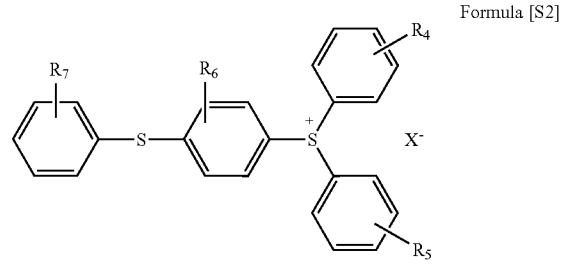

Formula [S2]

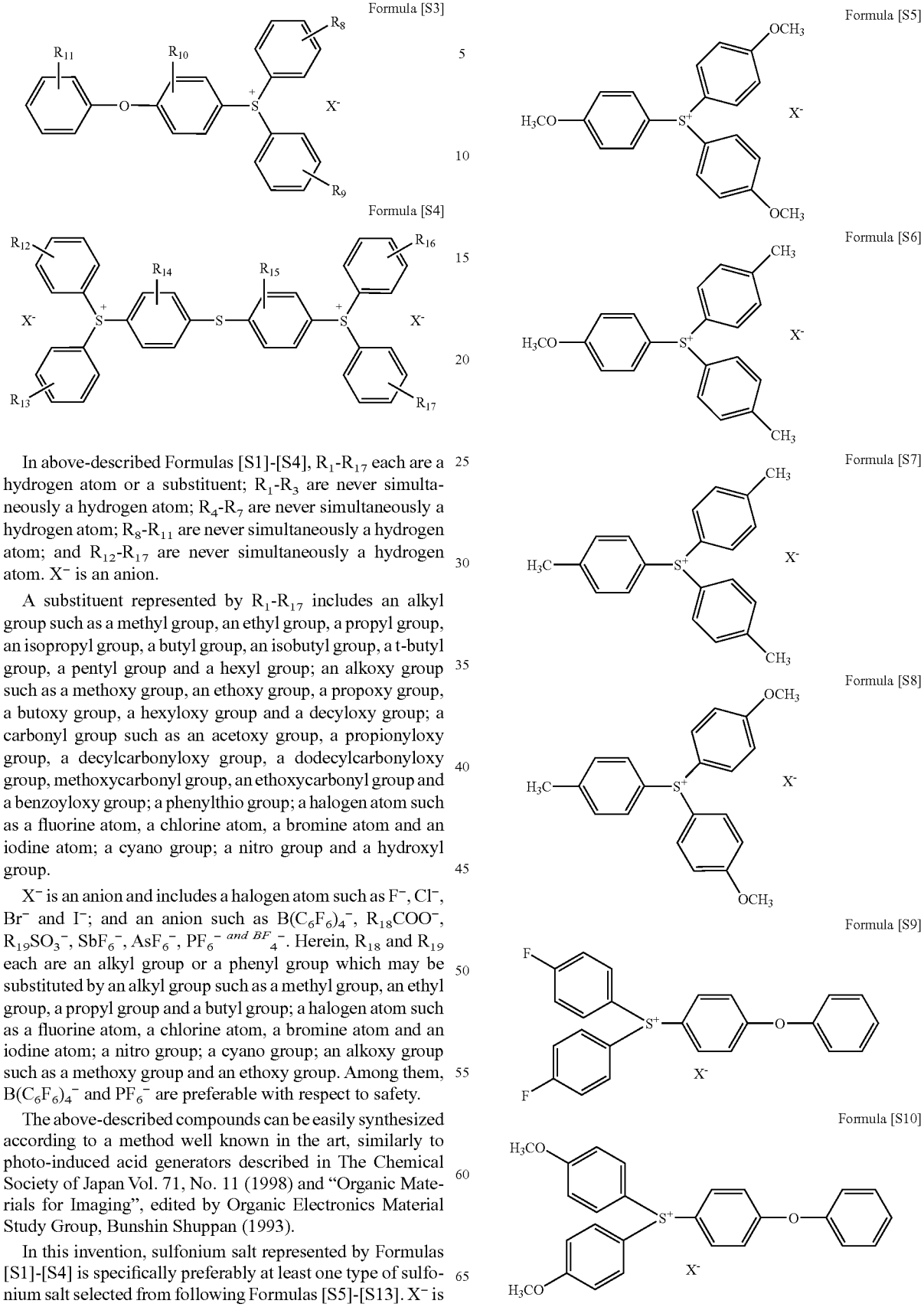

In above-described Formulas [S1]-[S4], $R_1$-$R_{17}$ each are a hydrogen atom or a substituent; $R_1$-$R_3$ are never simultaneously a hydrogen atom; $R_4$-$R_7$ are never simultaneously a hydrogen atom; $R_8$-$R_{11}$ are never simultaneously a hydrogen atom; and $R_{12}$-$R_{17}$ are never simultaneously a hydrogen atom. $X^-$ is an anion.

A substituent represented by $R_1$-$R_{17}$ includes an alkyl group such as a methyl group, an ethyl group, a propyl group, an isopropyl group, a butyl group, an isobutyl group, a t-butyl group, a pentyl group and a hexyl group; an alkoxy group such as a methoxy group, an ethoxy group, a propoxy group, a butoxy group, a hexyloxy group and a decyloxy group; a carbonyl group such as an acetoxy group, a propionyloxy group, a decylcarbonyloxy group, a dodecylcarbonyloxy group, methoxycarbonyl group, an ethoxycarbonyl group and a benzoyloxy group; a phenylthio group; a halogen atom such as a fluorine atom, a chlorine atom, a bromine atom and an iodine atom; a cyano group; a nitro group and a hydroxyl group.

$X^-$ is an anion and includes a halogen atom such as $F^-$, $Cl^-$, $Br^-$ and $I^-$; and an anion such as $B(C_6F_6)_4^-$, $R_{18}COO^-$, $R_{19}SO_3^-$, $SbF_6^-$, $AsF_6^-$, $PF_6^-$ and $BF_4^-$. Herein, $R_{18}$ and $R_{19}$ each are an alkyl group or a phenyl group which may be substituted by an alkyl group such as a methyl group, an ethyl group, a propyl group and a butyl group; a halogen atom such as a fluorine atom, a chlorine atom, a bromine atom and an iodine atom; a nitro group; a cyano group; an alkoxy group such as a methoxy group and an ethoxy group. Among them, $B(C_6F_6)_4^-$ and $PF_6^-$ are preferable with respect to safety.

The above-described compounds can be easily synthesized according to a method well known in the art, similarly to photo-induced acid generators described in The Chemical Society of Japan Vol. 71, No. 11 (1998) and "Organic Materials for Imaging", edited by Organic Electronics Material Study Group, Bunshin Shuppan (1993).

In this invention, sulfonium salt represented by Formulas [S1]-[S4] is specifically preferably at least one type of sulfonium salt selected from following Formulas [S5]-[S13]. $X^-$ is an anion and is identical with those described above.

Formula [S11]
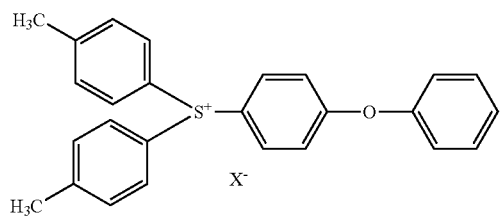
Formula [S12]
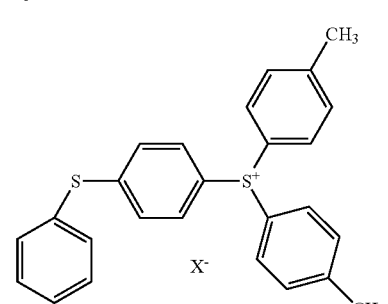
Formula [S13]
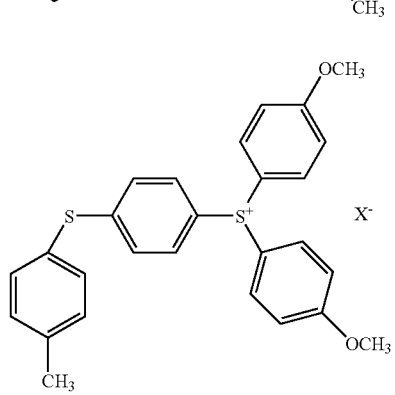
Exemplary compounds include the following compounds in addition to aforesaid [S5]-[S13], wherein X is $PF_6$.
Exemplary compound SE-1
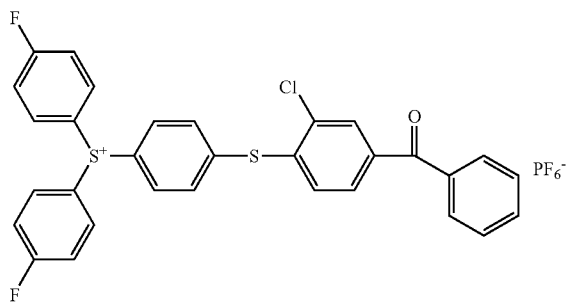
Exemplary compound SE-2
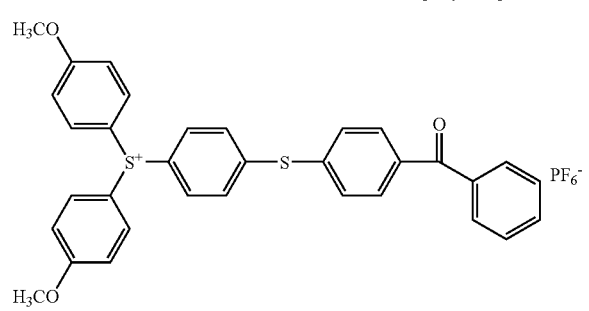
Exemplary compound SE-3
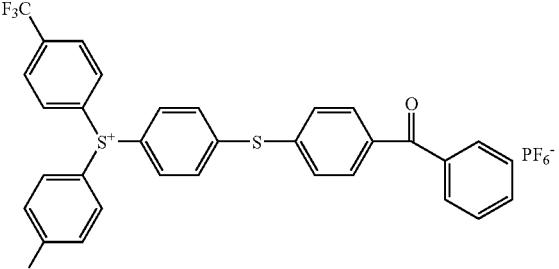
Exemplary compound SE-4
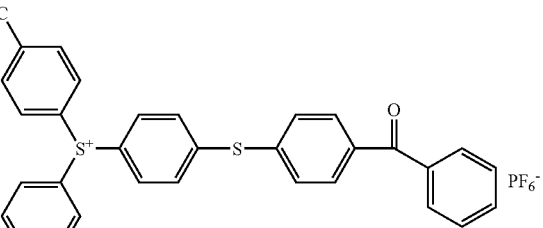
Exemplary compound SE-5
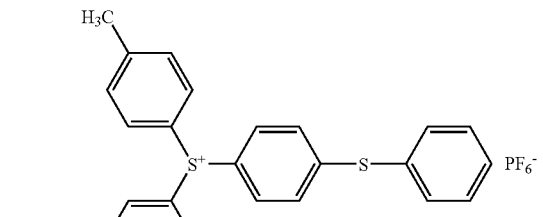
Exemplary compound SE-6
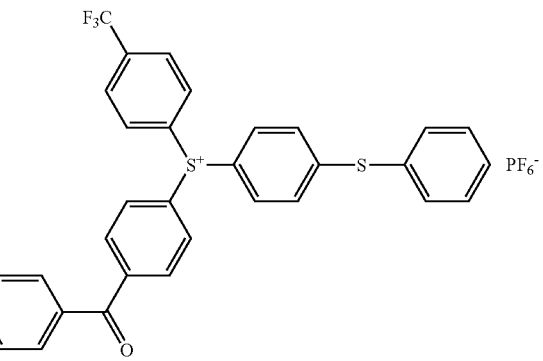

-continued

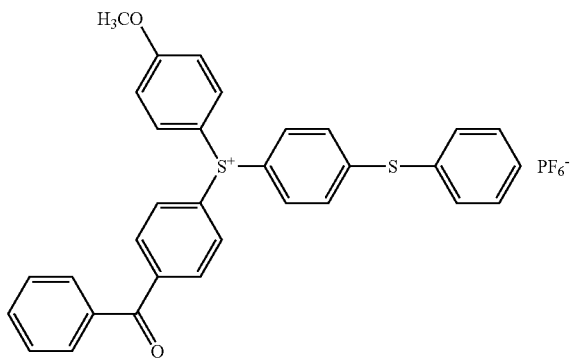

Exemplary compound SE-7

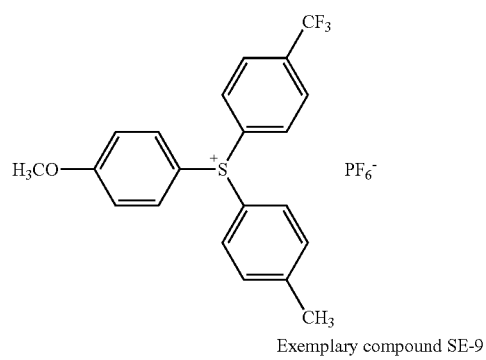

Exemplary compound SE-8

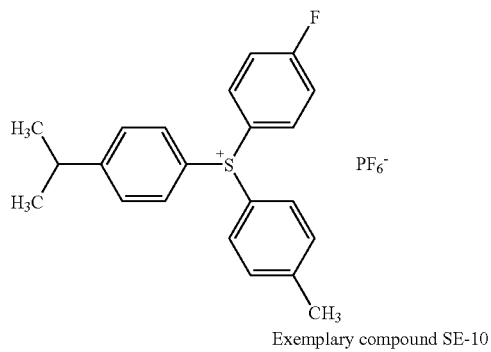

Exemplary compound SE-9

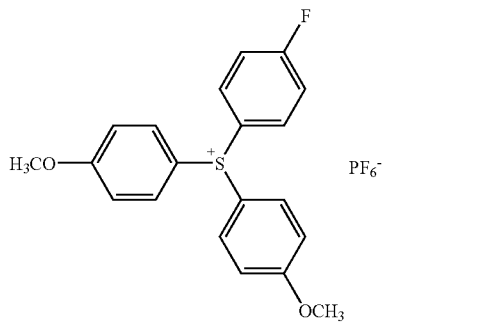

Exemplary compound SE-10

(Organic Pigment)

Active ray curable ink of this invention can incorporate various types of organic pigment well known in the art. In particular, at least one type of organic pigment incorporated in ink of this invention is preferably one having been subjected to a surface treatment such as an acidic treatment and a basic treatment.

As organic pigment preferably utilized in this invention, at least one type selected from the following is preferably utilized and it is necessary to control the content of quaternary ammonium salt in ink to 5-500 ppm by further subjecting these organic pigment having been subjected to a surface treatment to a purification treatment such as plural times of washing treatments with water and a column adsorption treatment:

1) C. I. Pigment Red 122, C. I. Pigment Red 185, C. I. Pigment Red 202 and C. I. Pigment Violet 19 for the active ray curable magenta ink, 2) C. I. Pigment Yellow 138, C. I. Pigment Yellow 120, C. I. Pigment Yellow 150, C. I. Pigment Yellow 151 and C. I. Pigment Yellow 180 for the active ray curable yellow ink, 3) C. I. Pigment Blue 15:3 and C. I. Pigment Blue 15:4 the active ray curable cyan ink.

For dispersion of the above-described pigment, such as a ball mill, a sand mill, an attritor, a roll mill, an agitator, a Henschel mixer, a colloidal mill, an ultrasonic homogenizer, a pearl mill, a wet type jet mill and a paint shaker can be utilized.

[Polymer Dispersant]

At the time of dispersing the above-described pigment, a polymer dispersant is utilized in this invention. As a polymer dispersant, it preferable to utilize those having an acid value and a base value, wherein the acid value being larger than the base value with respect to obtaining stable dispersion characteristics, and listed are such as PB series manufactured by Ajinomoto Fine Techno Co. Inc. and Hinoact series manufactured by Kawaken Fine Chemicals Co., Ltd. These polymer dispersants are preferably added at 1-60 weight parts and more preferably 35-60 weight parts, against 100 weight parts of pigment. Further, a synergist corresponding to various types of pigment may be utilized as a dispersion aid. These dispersant and a dispersion aid are preferably added at 1-50 weight parts against 100 weight parts of pigment.

As for a medium at the time of dispersion, it is preferably conducted by utilizing a polymerizing compound. Further, an acid value or a base value referred in this invention can be determined by a potentiometric titration method, and can be measured by a method described in Journal of Japan Society of Colour Material 61, [12] pp. 692-698 (1988). It can be expressed as a weight average value thereof, when plural number of pigment and dispersants are utilized.

In dispersion of pigment, a mean particle size of pigment particles is preferably made to be 0.08-0.25 μm, and selection of pigment, a polymer dispersant and a dispersion medium, dispersion conditions and filtration conditions will be appropriately set so as to make the maximum particle size of 0.3-5 μm, and preferably 0.3-3 μm. By this control of a particle size, it is possible to restrain clogging of a nozzle head and to maintain storage stability of ink.

In the ink of this invention, the colorant concentration is preferably 0.5 weight % to 10 weight % of the whole ink.

(Other Various Types of Additives)

In active ray curable ink of this invention, various additives other than the above-described ones can be utilized. For example, added can be a leveling additive; a matting agent; and polyester type resin, polyurethane type resin, vinyl type resin, acryl type resin, rubber type resin and waxes for adjustment of film physical properties.

Any basic compound well known in the art can be utilized for the purpose of improving storage stability, and typical examples include a basic alkali metal compound, a basic alkali earth metal compound and a basic organic compound such as amine. Further, radical-cation hybrid type curing ink can be also prepared by combining radical polymerizing monomer and an initiator.

Ink of this invention is preferably has a viscosity at 25° C. of 7-50 mPa·s to achieve stable ejection and excellent curing ability regardless of a curing environment (temperature and humidity).

As a recording material utilizable in this invention, utilized can be various types of non-absorptive plastic and film thereof applied for so called soft packaging such as ordinary non-coated paper and coated paper, and various plastic film includes such as polyethylene terephthalate (PET) film, oriented polystyrene film (OPS), oriented polypropylene (OPP) film, oriented nylon (ONy) film, polyvinyl chloride (PVC) film, polyethylene (PE) film and triacetyl cellulose (TAC) film. As other plastics, polycarbonate, acrylic resin, ABS, polyacetal, PVA and rubbers can be utilized. Further, metals, glasses are also applicable. Among these recording media, a constitution of this invention is effective when an image is formed on PET film, OPS film, OPP film, ONy film and PVC film, which are capable of shrinkage by heat. These substrates are liable to cause curl and deformation of film by curing shrinkage of ink and by heating at the time of a curing reaction as well as ink film hardly follows shrinkage of a substrate.

Various types of plastic films are significantly different in their surface energy from each other, resulting in change of the dot radius after ink landing depending on recording materials, which has been a problem. In a constitution of this invention, an excellent high definition image can be formed on a recording material, including OPP film and OPS film which have low surface energy, in addition to PET film which has relatively large surface energy, and having a wide range of the surface energy such as 35-60 mN/m.

In this invention, it is advantageous to utilize a long length (a web form) recording material with respect to a cost of a recording material such as packaging expense and a manufacturing cost, efficiency of print preparation, and adaptability to various types of print sizes.

EXAMPLES

In the following, this invention will be specifically explained referring to examples, however, an embodiment of this invention is not limited thereto.

<Synthesis of Epoxy Compound>

Epoxy compounds e-1-e-4 utilized in examples of this invention were synthesized in the following manner.

Synthesis of Epoxy Compound e-1

Synthesis Example 1

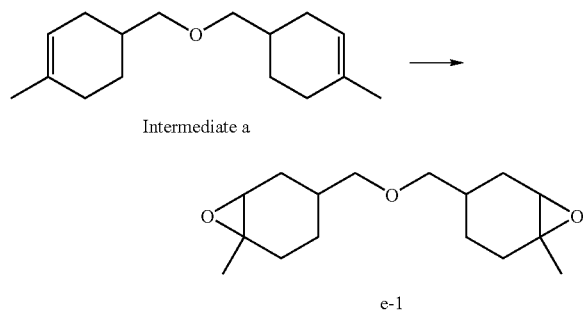

Tungstic acid ($H_2WO_4$) of 2 g (8 mmol), 2 g (6 mmol) of tetrabutylammonium bromide, 0.23 g (2 mmol) of 85% phosphoric acid ($H_3PO_4$) and 11.8 g (50 mmol) of intermediate a each were weighed and charged into a 300 ml four-neck distillation flask equipped with a thermometer, a Dimroth condenser and a stirrer. The system was added with 20 ml of toluene and heating was started while vigorously stirring. At the time when the temperature raised to 80° C., drop-wise addition of 10.7 g (110 mmol) of 35% hydrogen peroxide solution was started. The drop-wise addition was conducted over 30 minutes while keeping the temperature at 80° C. After finishing the drop-wise addition, the reaction was traced by means of gas chromatographic analysis to confirm disappearance of a starting material and generation of an objective product after approximately 3 hours. After finishing the reaction, excess hydrogen peroxide was deactivated by addition of a suitable amount of a sodium sulfate aqueous solution. The organic layer was separated and washed several times with water and a sodium bicarbonate aqueous solution. The organic layer was separated and e-1 was prepared by evaporation eliminating the solvent under reduced pressure. The objective product was confirmed by NMR and mass spectrometry.

Synthesis of Epoxy Compound e-2

Synthesis Example 2

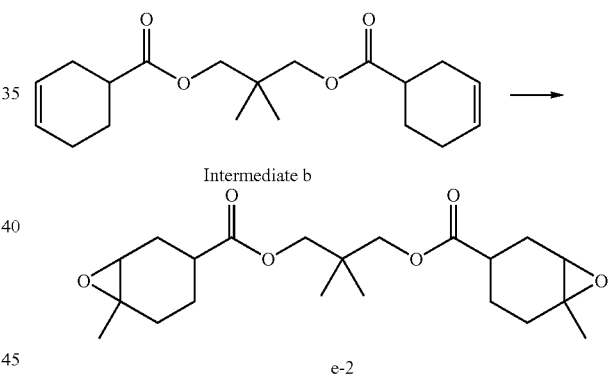

Tungstic acid ($H_2WO_4$) of 2 g (8 mmol), 2.7 g (6 mmol) of methyltrioctylammonium chloride, 0.23 g (2 mmol) of 85% phosphoric acid ($H_3PO_4$) and 16.0 g (50 mmol) of intermediate b each were weighed and charged into a 300 ml four-neck distillation flask equipped with a thermometer, a Dimroth condenser and a stirrer. The system was added with 20 ml of toluene and heating was started while vigorously stirring. At the time when the temperature raised to 80° C., drop-wise addition of 10.7 g (110 mmol) of 35% hydrogen peroxide solution was started. The drop-wise addition was conducted over 30 minutes while keeping the temperature at 80° C. After finishing drop-wise addition, the reaction was traced by means of gas chromatographic analysis to confirm disappearance of the starting material and generation of an objective product after approximately 3 hours. After finishing the reaction, excess hydrogen peroxide was deactivated by addition of a suitable amount of a sodium sulfate aqueous solution. The organic layer was separated and washed several times with water and a sodium bicarbonate aqueous solution. The organic layer was separated and e-2 was prepared by evaporation eliminating the solvent under reduced pressure. The objective product was confirmed by NMR and mass spectrometry.

Synthesis of Epoxy Compound e-3

Synthesis Example 3

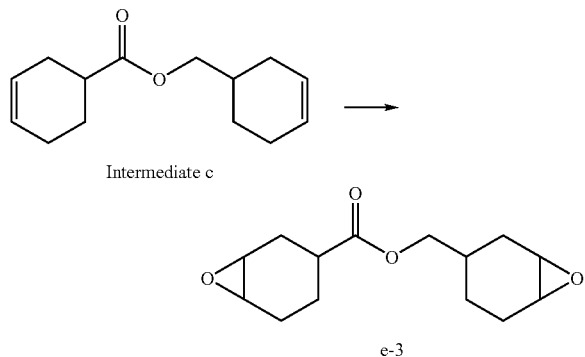

Tungstic acid ($H_2WO_4$) of 2 g (8 mmol), 1.7 g (6 mmol) of N-dodecyl-N'-methylimidazolium chloride, 0.23 g (2 mmol) of 85% phosphoric acid ($H_3PO_4$) and 11.0 g (50 mmol) of intermediate c each were weighed and charged into a 300 ml four-neck distillation flask equipped with a thermometer, a Dimroth condenser and a stirrer. The system was added with 20 ml of toluene and heating was started while vigorously stirring. At the time when the temperature raised to 80° C., drop-wise addition of 10.7 g (110 mmol) of 35% hydrogen peroxide solution was started. The drop-wise addition was conducted over 30 minutes while keeping the temperature at 80° C. After finishing drop-wise addition, the reaction was traced by means of gas chromatographic analysis to confirm disappearance of the starting material and generation of an objective product after approximately 3 hours. After finishing the reaction, excess hydrogen peroxide was deactivated by addition of a suitable amount of a sodium sulfate aqueous solution. The organic layer was separated and washed several times with water and a sodium bicarbonate aqueous solution. The organic layer was separated and e-3 was prepared by evaporation eliminating the solvent under reduced pressure. The objective product was confirmed by NMR and mass spectrometry.

Synthesis of Epoxy Compound e-4

Synthesis Example 4

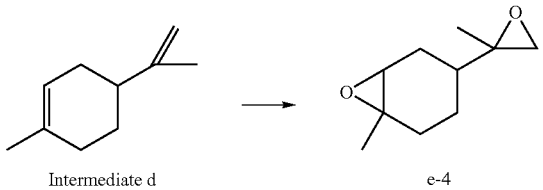

Tungstic acid ($H_2WO_4$) of 2 g (8 mmol), 2.0 g (6 mmol) of cetylpyridinium chloride, 0.23 g (2 mmol) of 85% phosphoric acid ($H_3PO_4$) and 6.8 g (50 mmol) of intermediate d each were weighed and charged into a 300 ml four-neck distillation flask equipped with a thermometer, a Dimroth condenser and a stirrer. The system was added with 20 ml of toluene and heating was started while vigorously stirring. At the time when the temperature raised to 80° C., drop-wise addition of 10.7 g (110 mmol) of 35% hydrogen peroxide solution was started. The drop-wise addition was conducted over 30 minutes while keeping the temperature at 80° C. After finishing drop-wise addition, the reaction was traced by means of gas chromatographic analysis to confirm disappearance of the starting material and generation of an objective product after approximately 4 hours. After finishing the reaction, excess hydrogen peroxide was deactivated by addition of a suitable amount of a sodium sulfate aqueous solution. The organic layer was separated and washed several times with water and a sodium bicarbonate aqueous solution. The organic layer was separated and e-4 was prepared by evaporation eliminating the solvent under reduced pressure. The objective product was confirmed by NMR and mass spectrometry.

<<Pigment>>

In an example of this invention, the following pigment having been surface treated was utilized. An acid value and a base value of the pigment surface are as follows: Pigment 1: Pigment Blue 15:4 (Cyanine Blue 4044, manufactured by Sanyo Color Works, base value of 8.0 mg/g, acid value of 0.0 mg/g), Pigment 2: Pigment Blue 15:4 (manufactured by Dainichiseika Color & Chemicals Mfg. Co., Ltd., base value of 7.8 mg/g, acid value of 1.9 mg/g), Pigment 3: Pigment Red 122 (CFR321, manufactured by Dainichiseika Color & Chemicals Mfg. Co., Ltd., base value of 6.1 mg/g, acid value of 4.1 mg/g), Pigment 4: Pigment Violet 19 (manufactured by Dainichiseika Color & Chemicals Mfg. Co., Ltd., base value of 5.8 mg/g, acid value of 4.0 mg/g), Pigment 5: Pigment Yellow 151 (E4GN-GT, manufactured by Lanxess K. K., base value of 9.1 mg/g, acid value of 6.4 mg/g), Pigment 6: Pigment Yellow 180 (CFY313-2, manufactured by Dainichiseika Color & Chemicals Mfg. Co., Ltd., base value of 4.9 mg/g, acid value of 3.0 mg/g).

<Measurement of Base Value of Pigment>

To the pigment, added was a 0.01 mol/L methyl butyl ketone solution of perchloric acid and subjected to ultrasonic dispersion. Thereafter, the supernatant by centrifugation was subjected to potentiometric titration with a 0.01 mol/L methyl isobutyl ketone/methanol (4:1) solution of potassium methoxide, to determine a converted KOH mg/g value of a reduced amount of hydrogen peroxide due to pigment as an amine value. The potentiometric titration was conducted by use of an automatic titration apparatus COM-1500 manufactured by Hiranuma Sangyo Co., Ltd.

<Measurement of Acid Value of Pigment>

To the pigment, added was a 0.01 mol/L methyl butyl ketone solution of tetrabutylammonium hydroxide and subjected to ultrasonic dispersion. Thereafter, the supernatant by centrifugation was subjected to potentiometric titration with a 0.01 mol/L methyl isobutyl ketone solution of perchloric acid, to determine a converted KOH mg/g value of a reduced amount of 0.01 mol/L tetrabutylammonium hydroxide due to pigment as an amine value. The potentiometric titration was conducted by use of an automatic titration apparatus COM-1500 manufactured by Hiranuma Sangyo Co., Ltd.

<<Measurement of Base Value and Acid Value of Dispersant>>

(Base Value Measurement of Dispersant)

A dispersant was dissolved in methyl isobutyl ketone and subjected to potentiometric titration with a 0.01 mol/L methyl isobutyl ketone solution of perchloric acid to determine a KOH mg/g converted value as a base value. The potentiometric titration was conducted by use of an automatic titration apparatus COM-1500 manufactured by Hiranuma Sangyo Co., Ltd.

(Acid Value Measurement of Dispersant)

A dispersant was dissolved in methyl isobutyl ketone and subjected to potentiometric titration with a 0.01 N methyl isobutyl ketone/methanol (4:1) solution of potassium methoxide to determine a KOH mg/g converted value as an acid value. The potentiometric titration was conducted by use of an automatic titration apparatus COM-1500 manufactured by Hiranuma Sangyo Co., Ltd.

<<Preparation of Dispersion>>

(Preparation of Dispersion A)

A pigment was dispersed as the following composition.

The following each compound was charged in a stainless beaker and dissolved with stirring for 1 hour while being heated on a hot plate of 65° C.

| | |
|---|---|
| PB822 (dispersant, manufactured by Ajinomoto-Fine-Techno Co., Inc.) (acid value of 18.5 mg/g, base value of 15.9 mg/g) | 8 parts |
| OXT221 (oxetane compound, manufactured by Toagosei Co., Ltd.) | 72 parts |

The system, after having been cooled to room temperature, was added with 20 parts of the aforesaid each pigment and then charged in a glass bottle to be sealed together with 200 g of zirconia beads having a diameter of 0.3 mm; after the system was subjected to a dispersion treatment by a paint shaker for 6 hours, zirconia beads were eliminated to prepare dispersion A.

(Preparation of Dispersion B)

Pigment was dispersed as the following composition.

The following each compound was charged in a stainless beaker and dissolved with stirring for 1 hour while being heated on a hot plate of 65° C.

| | |
|---|---|
| Solsperse 32000 (dispersant, manufactured by Avecia Co., Inc.) (acid value of 24.8 mg/g, base value of 27.1 mg/g) | 8 parts |
| Alicyclic epoxy compound (e-4), having been subjected to a column treatment | 72 parts |

The system, after having been cooled to room temperature, was added with 20 parts of the aforesaid each pigment and then charged in a glass bottle to be sealed together with 200 g of zirconia beads having a diameter of 0.3 mm; after the system was subjected to a dispersion treatment by a paint shaker for 8 hours, zirconia beads were eliminated to prepare Dispersion B.

<<Preparation of Inks 1-12>>

Inks 1-12 were prepared in the following manner according to the compositions described in Tables 1-12. The pigment utilized and presence of washing and column treatments were described together in each Table. Each ink prepared was filtered through a 3 μm Teflon (a registered trade mark) membrane filter, manufactured by Advantech Co., Ltd. After filtration, determination of quaternary ammonium salt in an ink composition was conducted by means of gas chromatography. The result will be also shown in following each Table.

Herein, UVI 6692 described in tables 4-6 and tables 8-10 is UV 16692 (50% solution of a propylene carbonate), and SP 152 described in table 11 and 12 is SP 152 (a 50% solution of propylene carbonate), manufactured by Dow Chemical Corp., and SP 152 described in tables 11 and 12 is SP 152 (a 50% solution of propylene carbonate), manufactured by Adeka Corp.,

TABLE 1

Ink 1 (Comparison) Viscosity: 33 mPa · s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 3 | once | — | 5 | 800 |
| Dispersion | Dispersion B | — | — | 20.0 | |
| Photo-polymerization compound (alicyclic epoxy compound) | e-3 | — | none | 24.3 | |
| Photo-polymerization compound (oxetane compound) | OXT-221 (Toagosei Co., Ltd.) | — | — | 40.0 | |
| Photo-polymerization compound (oxetane compound) | OXT-101 (Toagosei Co., Ltd.) | — | — | 10.0 | |
| Basic compound | N-ethyl diethanolamine | — | — | 0.2 | |
| Photo-initiator | DTS-102 (Midori Kagaku Co., Ltd.) | — | — | 5.5 | |

TABLE 2

Ink 2 (This invention) Viscosity: 31 mPa · s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 3 | three times | — | 5 | 10 |

TABLE 2-continued

Ink 2 (This invention) Viscosity: 31 mPa · s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Dispersion | Dispersion B | — | — | 20.0 | |
| Photo-polymerization compound (alicyclic epoxy compound) | e-3 | — | present | 24.3 | |
| Photo-polymerization compound (oxetane compound) | OXT-221 (Toagosei Co., Ltd.) | — | — | 40.0 | |
| Photo-polymerization compound (oxetane compound) | OXT-101 (Toagosei Co., Ltd.) | — | — | 10.0 | |
| Basic compound | N-ethyl diethanolamine | — | — | 0.2 | |
| Photo-initiator | DTS-102 (Midori Kagaku Co., Ltd.) | — | — | 5.5 | |

TABLE 3

Ink 3 (This invention) Viscosity: 18 mPa · s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 3 | three times | — | 5 | 10 |
| Dispersion | Dispersion B | — | — | 20.0 | |
| Photo-polymerization compound (alicyclic epoxy compound) | e-4 | — | present | 21.8 | |
| Photo-polymerization compound (vinyl ether compound) | CHVE (ISP Japan Ltd.) | — | — | 35.0 | |
| Photo-polymerization compound (vinyl ether compound) | DVE-3 (ISP Japan Ltd.) | — | — | 20.0 | |
| Basic compound | N-ethyl diethanolamine | — | — | 0.2 | |
| Photo-initiator | DTS-102 (Midori Kagaku Co., Ltd.) | — | — | 3.0 | |

TABLE 4

Ink 4 (Comparison) Viscosity: 29 mPa · s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 5 | once | — | 7 | 1000 |
| Dispersion | Dispersion A | — | — | 20.0 | |
| Photo-polymerization compound (alicyclic epoxy compound) | e-1 | — | none | 28.8 | |
| Photo-polymerization compound (oxetane compound) | OXT-221 (Toagosei Co., Ltd.) | — | — | 30.0 | |
| Photo-polymerization compound (oxetane compound) | OXT-212 (Toagosei Co., Ltd.) | — | — | 15.0 | |
| Basic compound | N-ethyl diethanolamine | — | — | 0.2 | |
| Photo-initiator | UVI 6992 | — | — | 6.0 | |

TABLE 5

Ink 5 (This invention) Viscosity: 27 mPa · s (25° C.)

| Types | Name of additive | Times of washing treatment of pigment | Presence of column treatment of epoxy | Blend ratio (weight %) | Content of quaternary ammonium salt (ppm) |
| --- | --- | --- | --- | --- | --- |
| Pigment | Pigment 5 | three times | — | 7 | 30 |
| Dispersion | Dispersion A | — | — | 20.0 | |
| Photo-polymerization compound (alicyclic epoxy compound) | e-1 | — | present | 28.8 | |
| Photo-polymerization compound (oxetane compound) | OXT-221 (Toagosei Co., Ltd.) | — | — | 30.0 | |
| Photo-polymerization compound (oxetane compound) | OXT-212 (Toagosei Co., Ltd.) | — | — | 15.0 | |
| Basic compound | N-ethyl diethanolamine | — | — | 0.2 | |
| Photo-initiator | UVI 6992 | — | — | 6.0 | |

TABLE 6

Ink 6 (This invention) Viscosity: 29 mPa · s (25° C.)

| Types | Name of additive | Times of washing treatment of pigment | Presence of column treatment of epoxy | Blend ratio (weight %) | Content of quaternary ammonium salt (ppm) |
| --- | --- | --- | --- | --- | --- |
| Pigment | Pigment 1 | three times | — | 7 | 30 |
| Dispersion | Dispersion A | — | — | 20.0 | |
| Photo-polymerization compound (alicyclic epoxy compound) | e-2 | — | present | 18.8 | |
| Photo-polymerization compound (oxetane compound) | OXT-221 (Toagosei Co., Ltd.) | — | — | 40.0 | |
| Photo-polymerization compound (oxetane compound) | OXT-212 (Toagosei Co., Ltd.) | — | — | 15.0 | |
| Basic compound | N-ethyl diethanolamine | — | — | 0.2 | |
| Photo-initiator | UVI 6992 | — | — | 6.0 | |

TABLE 7

Ink 7 (This invention) Viscosity: 16 mPa · s (25° C.)

| Types | Name of additive | Times of washing treatment of pigment | Presence of column treatment of epoxy | Blend ratio (weight %) | Content of quaternary ammonium salt (ppm) |
| --- | --- | --- | --- | --- | --- |
| Pigment | Pigment 4 | three times | — | 8 | 20 |
| Dispersion | Dispersion A | — | — | 20.0 | |
| Photo-polymerization compound (alicyclic epoxy compound) | e-1 | — | present | 21.8 | |
| Photo-polymerization compound (vinyl ether compound) | CHVE (ISP Japan Ltd.) | — | — | 35.0 | |
| Photo-polymerization compound (vinyl ether compound) | DVE-3 (ISP Japan Ltd.) | — | — | 20.0 | |
| Basic compound | N-ethyl diethanolamine | — | — | 0.2 | |
| Photo-initiator | DTS-102 (Midori Kagaku Co., Ltd.) | — | — | 3.0 | |

TABLE 8

Ink 8 (Comparison) Viscosity: 30 mPa·s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 6 | once | — | 8 | 900 |
| Dispersion | Dispersion A | — | — | 20.0 | |
| Photo-polymerization compound (alicyclic epoxy compound) | e-2 | — | none | 18.8 | |
| Photo-polymerization compound (oxetane compound) | OXT-221 (Toagosei Co., Ltd.) | — | — | 40.0 | |
| Photo-polymerization compound (oxetane compound) | OXT-213 (Toagosei Co., Ltd.) | — | — | 15.0 | |
| Basic compound | triisopropanolamine | — | — | 0.2 | |
| Photo-initiator | UVI 6992 | — | — | 6.0 | |

TABLE 9

Ink 9 (This invention) Viscosity: 32 mPa·s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 6 | three times | — | 8 | 20 |
| Dispersion | Dispersion A | — | — | 20.0 | |
| Photo-polymerization compound (alicyclic epoxy compound) | e-2 | — | present | 18.8 | |
| Photo-polymerization compound (oxetane compound) | OXT-221 (Toagosei Co., Ltd.) | — | — | 40.0 | |
| Photo-polymerization compound (oxetane compound) | OXT-213 (Toagosei Co., Ltd.) | — | — | 15.0 | |
| Basic compound | triisopropanolamine | — | — | 0.2 | |
| Photo-initiator | UVI 6992 | — | — | 6.0 | |

TABLE 10

Ink 10 (This invention) Viscosity: 34 mPa·s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 5 | three times | — | 4 | 20 |
| Dispersion | Dispersion A | — | — | 20.0 | |
| Photo-polymerization compound (alicyclic epoxy compound) | e-2 | — | present | 18.8 | |
| Photo-polymerization compound (oxetane compound) | OXT-221 (Toagosei Co., Ltd.) | — | — | 40.0 | |
| Photo-polymerization compound (oxetane compound) | OXT-213 (Toagosei Co., Ltd.) | — | — | 15.0 | |
| Basic compound | triisopropanolamine | — | — | 0.2 | |
| Photo-initiator | UVI 6992 | — | — | 6.0 | |

TABLE 11

Ink 11 (Comparison) Viscosity: 25 mPa·s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 2 | once | — | 3 | 800 |
| Dispersion | Dispersion A | — | — | 20.0 | |
| Photo-polymerization compound (alicyclic epoxy compound) | e-1 | — | none | 23.8 | |
| Photo-polymerization compound (oxetane compound) | OXT-221 (Toagosei Co., Ltd.) | — | — | 30.0 | |
| Photo-polymerization compound (oxetane compound) | OXT-211 (Toagosei Co., Ltd.) | — | — | 10.0 | |
| Photo-polymerization compound (epoxydated fatty acid butyl) | E-4030 (New Japan Chemical Co., Ltd.) | — | — | 10.0 | |
| Basic compound | triisopropanolamine | — | — | 0.2 | |
| Photo-initiator | SP 152 | — | — | 6.0 | |

TABLE 12

Ink 12 (This invention) Viscosity: 23 mPa·s (25° C.)

| Types | Name of additive | Times of washing treatment of pigment | Presence of column treatment of epoxy | Blend ratio (weight %) | Content of quaternary ammonium salt (ppm) |
|---|---|---|---|---|---|
| Pigment | Pigment 2 | three times | — | 3 | 5 |
| Dispersion | Dispersion A | — | — | 20.0 | |
| Photo-polymerization compound (alicyclic epoxy compound) | e-1 | — | present | 23.8 | |
| Photo-polymerization compound (oxetane compound) | OXT-221 (Toagosei Co., Ltd.) | — | — | 30.0 | |
| Photo-polymerization compound (oxetane compound) | OXT-211 (Toagosei Co., Ltd.) | — | — | 10.0 | |
| Photo-polymerization compound (epoxydated fatty acid butyl) | E-4030 (New Japan Chemical Co., Ltd.) | — | — | 10.0 | |
| Basic compound | triisopropanolamine | — | — | 0.2 | |
| Photo-initiator | SP 152 | — | — | 6.0 | |

<<Evaluation of Ink>>

Each ink prepared above was filled in a polyethylene container at a filling rate of 90% and each container, in which ink was filled, after having been sealed, was stored at 25° C. and at 60° C. for 2 weeks; then the following evaluations were made.

[Evaluation of Storage Stability]

A mean particle size was measured with respect to each ink stored at 25° C. and at 60° C.

The mean particle size is a volume average mean particle size measured by Zetasizer Nano Series, manufactured by Malvern Instruments Ltd.

A: Mean particle size difference between a 25° C.-stored sample and a 60° C.-stored sample is less than 10%.

B: Mean particle size difference between a 25° C.-stored sample and a 60° C.-stored sample is not less than 10% and less than 20%.

C: Mean particle size difference between a 25° C.-stored sample and a 60° C.-stored sample is not less than 20%.

[Evaluation of Ejection Stability]

Each ink stored at 25° C. and at 60° C. was continuously ejected from the all nozzle for 30 minutes by driving a recording head so as to make 4 pl size liquid droplets at a speed of 6 m/s from a recording head of an ink-jet printer, manufactured by Xaar Corp. having 256 nozzles, and the ejection state from each recording head nozzle was visually observed, whereby evaluation of ejection stability was made based on the following criteria.

A: No nozzle lack is generated even with 30 minutes continuous ejection.

B: No nozzle lack is generated but a slight satellite is generated with 30 minutes continuous ejection.

C: Nozzle lacks are generated at not less than a few nozzles with 30 minutes continuous ejection.

The above evaluation results will be shown in table 13. Herein, in explanation with respect to the above-described evaluation and table 31, evaluation rank A is a level being good in practical capability; B is a just allowable level in practical use; and C is a level out of an allowable range.

TABLE 13

| Ink No. | Storage stability | Ejection stability | | Remarks |
| --- | --- | --- | --- | --- |
| | | 25° C. storage | 60° C. storage | |
| 1 | C | A | C | Comparison |
| 2 | B | A | A | Invention |
| 3 | B | A | B | Invention |
| 4 | C | A | C | Comparison |
| 5 | A | A | A | Invention |
| 6 | A | A | A | Invention |
| 7 | A | A | B | Invention |
| 8 | C | B | C | Comparison |
| 9 | A | A | A | Invention |
| 10 | A | A | A | Invention |
| 11 | B | A | C | Comparison |
| 12 | A | A | A | Invention |

It is clear from the results described in Table 13 that the inks of this invention are excellent in storage stability and ejection stability.

What is claimed is:

1. An active ray curable ink-jet ink comprising at least an organic pigment, a polymer dispersant, a photo-initiator and a cationic polymerizable compound,
wherein the active ray curable ink-jet ink incorporates a quaternary ammonium salt and a content of the quaternary ammonium salt is not less than 5 ppm and not more than 500 ppm, and the polymer dispersant has an acid value and a base value and the acid value is not less than the base value.

2. The active ray curable ink-jet ink described in claim 1, wherein the cationic polymerizable compound is an epoxy compound.

3. The active ray curable ink-jet ink described in claim 1, wherein the photo-initiator is an onium salt and a content of the onium salt is not more than 5 weight %.

4. The active ray curable ink-jet ink described in claim 1, wherein the organic pigment is a surface treated pigment selected from the group consisting of C.I. Pigment Red 122, C. I. Pigment Red 185, C. I. Pigment Red 202 and C. I. Pigment Violet 19.

5. The active ray curable ink-jet ink described in claim 1, wherein the organic pigment is a surface treated pigment selected from the group consisting of C. I. Pigment Yellow 138, C. I. pigment Yellow 120, C. I. Pigment Yellow 150, C. I. pigment Yellow 151 and C. I. Pigment Yellow 180.

6. The active ray curable ink-jet ink described in claim 1, wherein the organic pigment is surface treated C. I. Pigment Blue 15:3 or surface treated C. I. pigment Blue 15:4.

7. The active ray curable ink-jet ink described in claim 1, wherein the ink has a viscosity of 7-50 mPa·s at 25° C.

8. The active ray curable ink-jet ink described in claim 1, wherein the quaternary ammonium salt is tetrabutylammonium bromide, tetrabutylammonium chloride, tetramethylammonium bromide, methyltrihexylammonium chloride, methyltrioctylammonium chloride, cetylpyridinium chloride, N-dodecyl-N'-methylimidazolium chloride or benzyltriethylammomnium chloride.

* * * * *